US011841778B2

(12) United States Patent
Qiu et al.

(10) Patent No.: US 11,841,778 B2
(45) Date of Patent: Dec. 12, 2023

(54) METHOD AND SYSTEM FOR ACTIVE FAILURE RECOVERY OF SINGLE NODE IMPROVED BASED ON PBFT ALGORITHM, COMPUTER DEVICE AND STORAGE MEDIUM

(71) Applicant: HANGZHOU QULIAN TECHNOLOGY CO., LTD., Zhejiang (CN)

(72) Inventors: Weiwei Qiu, Zhejiang (CN); Wei Li, Zhejiang (CN); Hao Duan, Zhejiang (CN); Fanglei Huang, Zhejiang (CN); Shuai Zhang, Zhejiang (CN); Lizhong Kuang, Zhejiang (CN)

(73) Assignee: HANGZHOU QULIAN TECHNOLOGY CO., LTD., Zhejiang (CN)

( * ) Notice: Subject to any disclaimer, the term of this patent is extended or adjusted under 35 U.S.C. 154(b) by 0 days.

(21) Appl. No.: 17/713,097

(22) Filed: Apr. 4, 2022

(65) Prior Publication Data
US 2022/0222156 A1    Jul. 14, 2022

Related U.S. Application Data

(63) Continuation-in-part of application No. PCT/CN2020/120111, filed on Oct. 10, 2020.

(30) Foreign Application Priority Data

Oct. 10, 2019   (CN) .......................... 201910956576.8

(51) Int. Cl.
G06F 11/00       (2006.01)
G06F 11/20       (2006.01)
H04L 41/0654     (2022.01)

(52) U.S. Cl.
CPC ...... *G06F 11/2023* (2013.01); *H04L 41/0654* (2013.01); *G06F 2201/85* (2013.01)

(58) Field of Classification Search
CPC ............. G06F 11/0709; G06F 11/1451; G06F 11/182; G06F 11/183; G06F 11/187;
(Continued)

(56) References Cited

U.S. PATENT DOCUMENTS 6,671,821 B1 * 12/2003 Castro ................. G06F 11/1482
                                                  714/21
11,057,504 B2 *  7/2021 Yang ........................ H04L 69/40
(Continued)

FOREIGN PATENT DOCUMENTS

CN      106447311 A      2/2017
CN      107423152 A  * 12/2017 .......... G06F 11/0709
(Continued)

OTHER PUBLICATIONS

Castro et al., "Practical Byzantine Fault Tolerance", ACM Transactions on Computer Systems, vol. 20, No. 4, Nov. 2002, pp. 398-461 (Year: 2002).*
(Continued)

*Primary Examiner* — Michael Maskulinski
(74) *Attorney, Agent, or Firm* — CANTOR COLBURN LLP (57)  ABSTRACT

A method for active failure recovery of a single node improved based on PBFT algorithm is disclosed. The abnormal node first initiates a view change request, if (2*f*+1) view change requests containing the same view value cannot be received within a specified period of time, the abnormal node enters a state to be recovered, and the node to be recovered initiates a recovery request to all nodes of the whole network, waits for replies from normal nodes and counts the number of replies, calculates a height of stable (Continued)

checkpoint of the whole network after receiving replies contain the same view value from ($2f+1$) nodes, and update the state thereof to finally complete the recovery. This method solves an inherent problem in the PBFT algorithm that a failure in a single node cannot be recovered autonomously, so that a practicability of the PBFT algorithm is greatly improved.

20 Claims, 3 Drawing Sheets

(58) Field of Classification Search
CPC ............. G06F 11/2023; G06F 11/2041; G06F 16/2365; G06F 16/2379; G06F 16/27; G06F 2201/82; G06F 9/5083; H04L 9/50; H04L 41/0654
See application file for complete search history.

(56) References Cited

U.S. PATENT DOCUMENTS

| | | | |
|---|---|---|---|
| 11,212,165 B2 | 12/2021 | Kano et al. | |
| 11,347,598 B2 | 5/2022 | Yang | |
| 2017/0061421 A1 | 3/2017 | Palmer | |
| 2018/0307573 A1 | 10/2018 | Abraham et al. | |
| 2018/0329783 A1 | 11/2018 | Karame et al. | |
| 2021/0273807 A1* | 9/2021 | Wertheim | G06F 9/466 |
| 2023/0027259 A1* | 1/2023 | Abraham | G06F 16/27 |

FOREIGN PATENT DOCUMENTS

| | | | |
|---|---|---|---|
| CN | 109039748 A | 12/2018 | |
| CN | 109347804 A | 2/2019 | |
| CN | 109784916 A | 5/2019 | |
| CN | 110166295 A | 8/2019 | |
| CN | 111130879 A | 5/2020 | |
| JP | 2006160051 A | 6/2006 | |
| JP | 201912510 A | 1/2019 | |
| JP | 2020518887 A | 6/2020 | |
| WO | WO-2019072263 A2 * | 4/2019 | .......... G06F 11/0709 |
| WO | 2019101245 A2 | 5/2019 | |

OTHER PUBLICATIONS

Machine Translation of CN 107423152 A1 (Year: 2017).*
Zhao, Z. "Application of Byzantine fault-tolerant algorithm with active recovery in blockchain"; Submitted: Jan. 5, 2018; 93 Pages, English Abstract Only.
First Office Action dated Nov. 21, 2019; Chinese Application No. 201910956576.8; 5 pages (English).
First Office Action dated Nov. 21, 2019; Chinese Application No. 201910956576.8; 5 pages (non-English).
International Search Report dated Jan. 7, 2021; International Application No. PCT/CN2020/120111; 2 pages (English).
International Search Report dated Jan. 7, 2021; International Application No. PCT/CN2020/120111; 3 pages (non-English).
Notice of Reasons for Refusal dated Apr. 3, 2023; Japanese Application No. 2022-513959; 4 pages (English).
Notice of Reasons for Refusal dated Apr. 3, 2023; Japanese Application No. 2022-513959; 4 pages (non-English).
Notification to Grant dated Jan. 2, 2020; Chinese Application No. 201910956576.8; 2 pages (English).
Notification to Grant dated Jan. 2, 2020; Chinese Application No. 201910956576.8; 2 pages (non-English).
Search Report dated Mar. 15, 2023; Japanese Application No. 2022-513959; 18 pages (non-English).
Search Report dated Mar. 15, 2023; Japanese Application No. 2022-513959; 26 pages (English).
Search Report dated Oct. 22, 2019; Chinese Application No. 201910956576.8; 1 page.
Supplemental Search Report dated Nov. 29, 2019; Chinese Application No. 201910956576.8; 1 page.
Written Opinion dated Jan. 7, 2021; International Application No. PCT/CN2020/120111; 4 pages (non-English).
Written Opinion dated Jan. 7, 2021; International Application No. PCT/CN2020/120111; 5 pages (English).

* cited by examiner

METHOD AND SYSTEM FOR ACTIVE FAILURE RECOVERY OF SINGLE NODE IMPROVED BASED ON PBFT ALGORITHM, COMPUTER DEVICE AND STORAGE MEDIUM

CROSS-REFERENCE TO RELATED APPLICATIONS

This application is a continuation-in-part of International patent application Serial No. PCT/CN2020/120111, field on Oct. 10, 2020, which claims priority to Chinese patent application No. 201910956576.8 filed on Oct. 10, 2019 and entitled "method and system for active failure recovery of single node improved based on PBFT algorithm", the contents each of which are incorporated herein by reference thereto.

TECHNICAL FIELD

The present application relates to the technical field of Practical Byzantine Fault Tolerance algorithm, and particularly relates to a method for active failure recovery of single node improved based on PBFT algorithm, a system for active failure recovery of single node improved based on PBFT algorithm, a computer device and a computer readable storage medium.

BACKGROUND

PBFT is the abbreviation of Practical Byzantine Fault Tolerance, that is, Practical Byzantine Fault Tolerance Algorithm. This PBFT algorithm is proposed by Miguel Castro and Barbara Liskov, and seeks to solve a problem of low efficiency of the original Byzantine Fault Tolerance algorithm, a complexity of time of the PBFT algorithm is $O(N^2)$, thus, the Byzantine fault tolerance problem can be solved in the actual application of system. In order to tolerate the existence of F Byzantine nodes, the PBFT requires that there are at least (3f+1) nodes in the whole network.

The normal consensus process of the PBFT algorithm is divided into three stages including Pre-Prepare phase, Prepare phase, and Commit phase. After a slavery node detects that a master node is abnormal, the slavery node triggers a view change to change the master node to ensure the normal service of the system provided for the outside. However, when one node disconnects with the master node for a short time, this node is still in the normal state after it enters the view change state because other nodes are still normally connected with the master node, therefore, this node can only repeatedly and continuously send view change request, and can be restored to the normal state only when the whole network enters the next view change, a time length spent on failure recovery depends on the time when the whole network triggers the next failure recovery, this passive recovery is obviously not practical for practical application.

SUMMARY

According to the various embodiments of the present application, a method for active failure recovery of a single node improved based on PBFT algorithm is provided, a point-to-point network containing (3f+1) nodes is required in the PBFT algorithm, at most Byzantine errors of F nodes are tolerable for this point-to-point network, and the method includes following steps:

step S1: enabling a node operated normally to enter into an abnormal state to become an abnormal node when detecting a failure in a system due to network malfunction;

step S2: broadcasting a view change request to all nodes in a whole network, and requesting to enter a next view by the abnormal node; where the view change request in the step S2 comprises an ID, a proposed view value, a height of a stable checkpoint, and PQC information of the node;

step S3: waiting for view change requests from other nodes within a predetermined period of time and counting a number of the view change requests, and performing recovery for the abnormal node according to a view change recovery method in the PBFT algorithm by the abnormal node, if (2f+1) view change requests containing the same view value are received within the predetermined period of time; or alternatively enabling the abnormal node to enter into a state to be recovered to become a node to be recovered if (2f+1) view change requests are not received within the predetermined period of time;

step S4: broadcasting a recovery request to all nodes in the whole network by the node to be recovered, where the recovery request includes an ID of the node to be recovered;

step S5: waiting for replies from other nodes and counting a number of the replies within the predetermined period of time by the node to be recovered, wherein each of other normal nodes returns a view value and a height of a stable checkpoint, an ID and PQC information thereof after receiving the recovery request from the node to be recovered; entering step S6 to perform a state recovery if the node to be recovered receives (2f+1) replies with the same view value within the predetermined period of time; or alternatively returning to step S4 if the node to be recovered fails to receive (2f+1) replies with the same view value within the predetermined period of time;

where the PQC information includes a Pre-Prepare message, a Prepare message, and a Commit message;

step S6: calculating, by the node to be recovered, a height of a stable checkpoint of the whole network according to checkpoint information returned by the (2f+1) nodes, performing recovery on the stable checkpoint through a fast synchronization algorithm in the PBFT, and performing a final recovery after the recovery performed on the stable checkpoint is completed, if the height of the stable checkpoint of the node to be recovered is lower than the height of the stable checkpoint of the whole network; or directly performing a final recovery in step S7 if the height of the stable checkpoint of the node to be recovered is equal to or greater than the height of the stable checkpoint of the whole network;

step S7: submitting a request for obtaining PQC information after the stable checkpoint to all nodes of the whole network by the node to be recovered;

step S8: returning, by the other normal nodes, all PQC information after the stable checkpoints of the other normal nodes, after receiving the request for obtaining the PQC information; and step S9: redoing the PQC information, by the node to be recovered, according to PQC reply information received from the other normal nodes until the node to be recovered is restored to a height of normal node, thus completing recovery of the abnormal node.

Furthermore, the view change request in the step S2 further includes signature information of the node.

Furthermore, in the step S3 and the step S5, a counting rule is that one node can only be counted one time, the node is counted one time when reply information is received multiple times from the same node at the same time within the predetermined period of time.

Furthermore, the recovery request in the step S4 further includes signature information of the node to be recovered.

Furthermore, the reply information from the other normal node in the step S5 further includes signature information of the node.

Furthermore, in the step S9, the node to be recovered redoes the PQC information at a height above the height thereof so as to be avoided from a repeated execution of the same PQC after receiving the PQC reply information, thus being caused to execute an error process to enter an abnormal state again.

According to the various embodiments of the present application, a method for active failure recovery of a single node improved based on PBFT algorithm is further provided, where the method is applied to a point-to-point network containing (3f+1) nodes, Byzantine errors of F nodes are tolerable for this point-to-point network, the method includes following steps:

determining an abnormal node, and sending a view change request to other nodes in a whole network by the abnormal node; where the view change request is used for requesting to enter a next view, the view change request includes an ID of the node, a view value proposed by the node, a height of a stable checkpoint of the node, and PQC-Set information of the node; the PQC-Set information respectively corresponds to P-Set Q-Set, and C-Set which are defined for recovery of view change in the PBFT algorithm;

waiting for view change requests from other nodes and counting a number of the view change requests within a first predetermined period of time, and setting the abnormal node as a node to be recovered if (2f+1) view change requests are not received within the first predetermined period of time;

sending a recovery request to other nodes in the whole network by the node to be recovered, where the recovery request comprises an ID of the node to be recovered;

waiting for replies from the other nodes and counting a number of the replies in a second predetermined period of time, where each other node returns a view value and a height of a stable checkpoint, an ID, and PQC-Set information thereof after receiving the recovery request of the node to be recovered; and performing a state recovery if (2f+1) replies containing the same view value are received within the second predetermined period of time;

said performing the state recovery includes:

obtaining a height of a stable checkpoint of the whole network according to the height of the stable checkpoint and the PQC-Set information returned by the (2f+1) nodes, performing a recovery on the stable checkpoint through a fast synchronization algorithm in the PBFT, and performing a final recovery after the recovery performed on the stable checkpoint is completed, if the height of the stable checkpoint of the node to be recovered is lower than the height of the stable checkpoint of the whole network; or alternatively performing the final recovery if the height of the stable checkpoint of the node to be recovered is greater than or equal to the height of the stable checkpoint of the whole network;

said performing the final recovery includes:

obtaining, by the node to be recovered, PQC information after the stable checkpoints from the other nodes in the whole network, where the PQC information includes a Pre-Prepare message, a Prepare message, and a Commit message; and redoing the PQC information according to the PQC reply information after the other nodes return their own stable checkpoints, until the node to be recovered is restored to the normal node.

In one embodiment, after the step of waiting for view change requests from other nodes and counting the number of the view change requests within the first predetermined period of time, the method further include a step of:

completing a recovery of the node to be recovered through the view change recovery method in the PBFT algorithm if (2f+1) view change requests containing the same view value are received in the first predetermined period of time.

In one embodiment, after the step of waiting for view change requests from other nodes and counting the number of the view change requests within the second predetermined period of time, the method further comprises a step of:

returning to perform the step of sending the recovery request to all other nodes in the whole network by the node to be recovered, if the node to be recovered fails to receive (2f+1) replies containing the same view value.

In one embodiment, the view change request further includes signature information of the node.

In one embodiment, each node is counted one time in a counting process.

In one embodiment, the recovery request further includes signature information of the node to be recovered.

In one embodiment, the PQC reply information after the other nodes return their own stable checkpoints includes signature information of the node.

In one embodiment, said redoing according to the PQC reply information after the other nodes return their own stable checkpoints includes a following step of:

redoing PQC information at a height above the height of the stable checkpoint of the node to be recovered.

According to the various embodiments of the present application, a computer device is further provided, the computer device includes a memory and a processor, the memory stores a computer program, that, when being executed by the processor, causes the processor to implement the steps in the method for active failure recovery of single node improved based on PBFT algorithm.

According to the various embodiments of the present application, a computer readable storage medium is further provided, the storage medium stores a computer program, that, when being executed by a processor, causes the processor to implement the steps in the method for active failure recovery of a single node improved based on PBFT algorithm.

The present application has the beneficial effects as follows:

in the method of the present application, a failure recovery process of a single node is added on the basis of the PBFT algorithm, failure recovery of an abnormal node is performed according to two steps, in step one, a view change method based on a classic PBFT algorithm is used to attempt to perform the failure recovery, if the recovery is failed due to expiration, a method for failure recovery of a single node in the second step is entered, in this method, view values are updated by obtaining (2f+1) nodes containing the same view value; and the checkpoint is quickly recovered by obtaining the heights of the checkpoints of the (2f+1) nodes, so that the speed of recovery is improved. The improved method for active failure recovery of a single node based on the PBFT algorithm provided by the present application makes an improvement on the passive recovery method in case of failure in the single node in the classic PBFT algorithm, the speed of failure recovery during operation of the node is greatly improved, and the practicability of the PBFT algorithm is improved.

BRIEF DESCRIPTION OF DRAWINGS

In order to describe and illustrate the embodiments and/or examples of the invention disclosed herein more clearly, reference may be made to one or more figures. Additional details or examples for describing the figures should not be considered as limitations to the scope of any one of the disclosed inventions, the currently described embodiments and/or examples, as well as the best modes of the inventions that are currently understood.

DESCRIPTION OF EMBODIMENTS

In order to facilitate understanding of the present application, and in order to make the above objectives, features, and advantages of the present application be more comprehensible, specific embodiments of the present application will be described in detail below with reference to the accompanying drawings. In the following descriptions, many technical details are illustrated in order to facilitate a thorough understanding of the present application, and some preferable embodiments are provided in the accompanying drawings. However, the present application can be implemented in many different forms and thus is not limited to the embodiments described herein. On the contrary, the objective of providing these embodiments is to provide a more thorough and comprehensive understanding of the disclosed contents of the present application. The present application can be implemented in many different methods than those described herein, and a person skilled in the art can make similar improvements without departing from the connotation of the present application, therefore, the present application is not limited by the embodiments disclosed in detail below.

In addition, terms "the first" and "the second" are only used for description purposes, and should not be considered as indicating or implying any relative importance, or implicitly indicating the number of indicated technical features. As such, technical feature(s) restricted by "the first" or "the second" can explicitly or implicitly includes one or more such technical feature(s). In the description of the present application, "a plurality of" means two or more, unless otherwise there is additional explicit and detailed limitation. In the descriptions of the present application, "the plurality of" means at least one, such as one, two, etc., unless otherwise there is additional explicit and detailed limitation.

Unless otherwise being defined, all technologies and scientific terms used herein have the same meaning as that can be commonly understood by one of ordinary skill in the technical field which the present application belongs to. The terminology used herein is only for the purpose of describing the detailed embodiments and is not intended to limit the present application. The term "and/or" used herein includes arbitrary combination and all combinations of one or more of the associated listed items.

Figure 1:
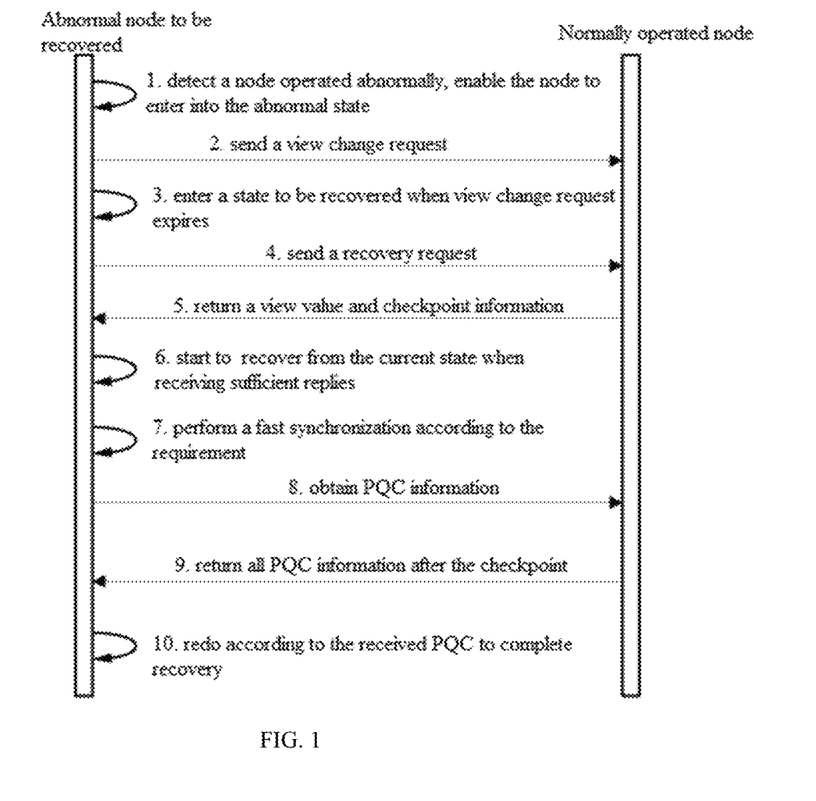
FIG. 1 illustrates a schematic flow diagram of active recovery from abnormality of single node according to one embodiment of the present application.

As shown in FIG. 1, a method for active failure recovery of single node improved based on PBFT algorithm is provided, a point-to-point network containing (3f+1) nodes is required in the PBFT algorithm, Byzantine errors of F nodes at most are tolerable for this point-to-point network, the method includes following steps:

At step S1: a node operated normally is enabled to enter into an abnormal state to become an abnormal node when detecting a failure in a system due to network malfunction.

At step S2: a view change request is broadcasted to all nodes in a whole network, and a request of entering a next view is submitted by the abnormal node; where the view change request includes an ID of the node, a proposed view value of the node, a height of a stable checkpoint of the node, and PQC information of the node.

At step S3: view change requests from other nodes are waited within a predetermined period of time and a number of the view change requests are counted, and a recovery for the abnormal node is performed according to a view change recovery method in the PBFT algorithm by the abnormal node, if (2f+1) view change requests containing the same view value are received within the predetermined period of time; or the abnormal node is enabled to enter into a state to be recovered to become a node to be recovered, if (2f+1) view change requests are not received within the predetermined period of time.

In this step, the abnormal node attempts to make a view change firstly, if there are more than (2f+1) nodes in the whole network that are attempting to initiate a view change with the same view value, the abnormal node can complete recovery from abnormality directly through the view change method, in particular, the abnormal node determines a master node in the new view according to a view value proposed by the (2f+1) nodes in the whole network, and waits for the new master node to send a confirmation message, and complete the recovery from abnormality when the confirmation message is received; if the abnormal node fails to receive view change requests of (2f+1) nodes within a predetermined period of time, it indicates that the whole network is in a normal state, and this node is only in an abnormal state, at this time, the abnormal node directly enters a state to be recovered, and performs an autonomous recovery by means of a subsequent recovery method without using a method of continuously and repeatedly sending view change request in the original PBFT algorithm to passively wait for recovery.

At step S4: a recovery request is broadcasted to all nodes in the whole network by the node to be recovered, where the recovery request includes an ID of the node to be recovered.

At step S5: replies from other nodes are waited and a number of the replies are counted within the predetermined period of time by the node to be recovered, where each of other normal nodes returns a view value and a height of a stable checkpoint, an ID and PQC information thereof after receiving the recovery request from the node to be recovered; step S6 is entered to perform a state recovery if the node to be recovered receives (2f+1) replies with the same view value within the predetermined period of time; or step S4 is returned if the node to be recovered fails to receive (2f+1) replies with the same view value within the predetermined period of time.

Where the PQC information include a Pre-Prepare message, a Prepare message, and a Commit message.

At step S6: a height of a stable checkpoint of the whole network is calculated by the node to be recovered according to the checkpoint information returned by the (2f+1) nodes, and a recovery is performed on the checkpoint through a fast synchronization algorithm in the PBFT, and a final recovery is performed after the recovery performed on the checkpoint is completed, if the height of the stable checkpoint of the node to be recovered is lower than the height of the stable checkpoint of the whole network; or the final recovery is directly performed in step S7 if the height of the stable checkpoint of the node to be recovered is equal to or greater than the height of the stable checkpoint of the whole network.

At step S7: a request for obtaining PQC information after the stable checkpoint is submitted to all nodes of the whole network by the node to be recovered.

At step S8: all PQC information after the stable checkpoints of the other normal nodes are returned by the other normal nodes, after the request for obtaining the PQC information is received.

At step S9: redo the PQC information by the node to be recovered according to PQC reply information received from the other normal nodes until the node to be recovered is restored to a height of normal node, so that the abnormal node is recovered.

Due to the fact that the PQC information is a three-stage consensus message in the PBFT algorithm, the abnormal node can be completely restored to a height of the normal node according to the PQC information.

According to the improved method for active failure recovery of single node based on the PBFT algorithm in the present application, the abnormal node can autonomously trigger an failure recovery process, thereby greatly reducing the time spent on failure recovery.

In one preferable embodiment, the view change request in the step S2 further includes signature information of the node.

In one preferable embodiment, in the step S3 and the step S5, a counting rule is that one node can only be counted one time, the node can only be counted one time when reply information is received multiple times from the same node at the same time within the predetermined period of time.

In one preferable embodiment, the recovery request in the step S4 further includes signature information of the node to be recovered. The signature information of the node to be recovered is used to authenticate the ID of the node and prevent a malicious node from falsifying the recovery request and thus consuming the network bandwidth of the normal node accordingly.

In one preferable embodiment, the reply information from the other normal node in the step S5 further includes signature information of the node. Where the signature information is used to authenticate the normal node ID of the node to be recovered to prevent the malicious node from falsifying the reply information and thus causing the node to be recovered to be unable to recover.

In one preferable embodiment, in the step S9, the node to be recovered only redoes the PQC information at a height above the height thereof so as to be avoided from a repeated execution of the same PQC after receiving the PQC reply information, thus being caused to execute an error process to enter an abnormal state again.

Figure 2:
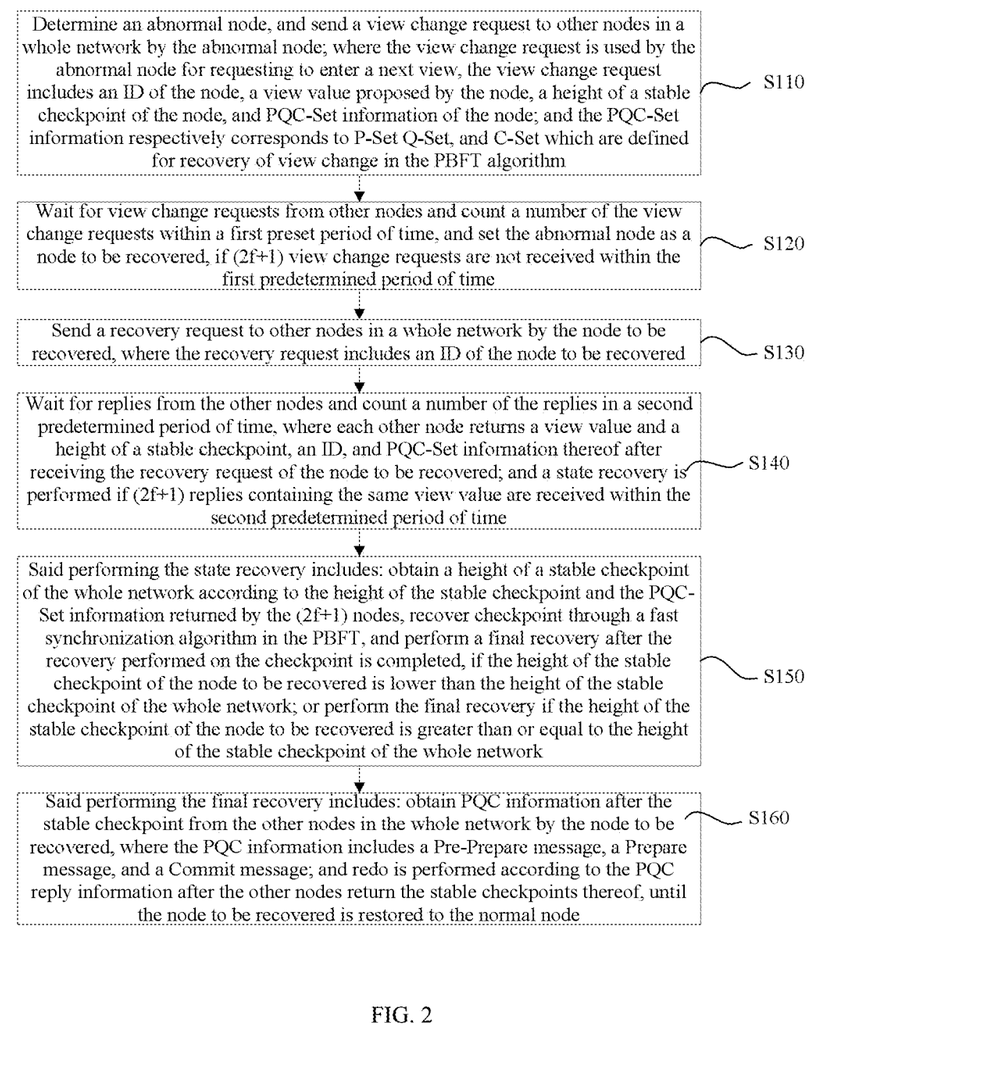
FIG. 2 illustrates a schematic flow diagram of a method for active failure recovery of single node improved based on PBFT algorithm according to one embodiment of the present application.

Furthermore, as shown in FIG. 2, a method for active failure recovery of single node improved based on PBFT algorithm disclosed in the present application can be applied to a point-to-point network including (3f+1) nodes, Byzantine errors of F nodes at most are tolerable for this point-to-point network, the method for active failure recovery of single node improved based on PBFT algorithm can be realized by the following steps:

At step S110: an abnormal node is determined, and a view change request is sent to other nodes in a whole network by the abnormal node; where the view change request is used by the abnormal node for requesting to enter a next view, the view change request includes an ID of the node, a view value proposed by the node, a height of a stable checkpoint of the node, and PQC-Set information of the node; and the PQC-Set information respectively corresponds to P-Set Q-Set, and C-Set which are defined for recovery of view change in the PBFT algorithm.

At step S120: view change requests from other nodes are waited and a number of the view change requests are counted within a first predetermined period of time, and the abnormal node is set as a node to be recovered, if (2f+1) view change requests are not received within the first predetermined period of time.

At step S130: a recovery request is sent to other nodes in a whole network by the node to be recovered, where the recovery request includes an ID of the node to be recovered.

At step S140: replies from the other nodes is waited and a number of the replies is counted in a second predetermined period of time, where each other node returns a view value and a height of a stable checkpoint, an ID, and PQC-Set information thereof after receiving the recovery request of the node to be recovered; and a state recovery is performed if (2f+1) replies containing the same view value are received within the second predetermined period of time.

At step S150: said performing the state recovery includes: a height of a stable checkpoint of the whole network is obtained according to the height of the stable checkpoint and the PQC-Set information returned by the (2f+1) nodes, a recovery is performed on the checkpoint through a fast synchronization algorithm in the PBFT, and a final recovery is performed after the recovery performed on the checkpoint is completed, if the height of the stable checkpoint of the node to be recovered is lower than the height of the stable checkpoint of the whole network; or alternatively the final recovery is performed if the height of the stable checkpoint of the node to be recovered is greater than or equal to the height of the stable checkpoint of the whole network.

At step S160: said performing the final recovery includes: PQC information after the stable checkpoint from the other nodes in the whole network is obtained by the node to be recovered, where the PQC information includes a Pre-Prepare message, a Prepare message, and a Commit message; and redo the PQC information according to the PQC reply information after the other nodes return their own stable checkpoints, until the node to be recovered is restored to the normal node.

In one embodiment, after the step of waiting for view change requests from other nodes and counting the number of the view change requests within the first predetermined period of time, the method further includes a following step of:

completing the recovery through the view change recovery method in the PBFT algorithm if (2f+1) view change requests containing the same view value are received in the first predetermined period of time.

In one embodiment, after the step of waiting for view change requests from other nodes and counting the number of the view change requests within the second predetermined period of time, the method further includes a following step of:

returning to perform the step of sending the recovery request to all other nodes in the whole network by the node to be recovered, if the node to be recovered fails to receive (2f+1) replies containing the same view value.

In one embodiment, the view change request further includes signature information of the node.

In one embodiment, each node is counted one time in a counting process.

In one embodiment, the recovery request further includes signature information of the node to be recovered.

In one embodiment, the PQC reply information after the other nodes return their own stable checkpoints includes signature information of the node.

In one embodiment, said redoing according to the PQC reply information after the other nodes return their own stable checkpoints includes:

redoing PQC information at a height above the height of the stable checkpoint of the node to be recovered.

Figure 3:
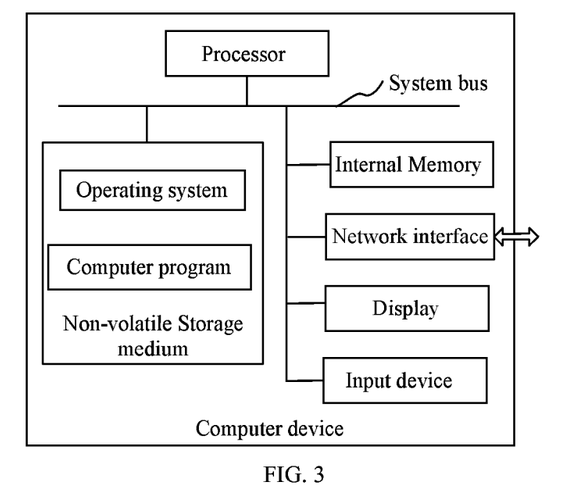
FIG. 3 illustrates a block diagram of an inner structure of a computer device according to one embodiment of the present application.

In one embodiment, a computer device for performing a method for active failure recovery of single node improved based on PBFT algorithm is provided, where the computer device can be a terminal device, and an internal structure diagram of the computer device may be shown in FIG. 3. The computer device includes a processor, a memory, a network interface, a display screen, and an input device which are connected through a system bus. The processor of the computer device is configured to provide computing and control capabilities. The memory of the computer device includes a non-volatile storage medium and an internal memory. The non-volatile storage medium stores an operating system and a computer program. The internal memory provides an environment for operating the operating system and the computer program in the non-volatile storage medium. The network interface of the computer device is configured to communicate with an external terminal through network connection. The computer program is configured to, when being executed by a processor, implements an improved method for active failure recovery of single node based on a PBFT algorithm. The display screen of the computer device may be a LCD (Liquid Crystal Display) screen or an electronic ink display screen, the input device of the computer device can be a touch layer covered on the display screen, the input device can also be a button, a trackball, or a touch pad provided on the housing of the computer device, the input device can also be an external keyboard, a touchpad or a mouse.

It should be understood by those skilled in the art that the structure shown in FIG. 4 is merely a block diagram of a partial structure related to the solution of the present application, and does not constitute a definition of a generation device of a smart contract client program applied thereto, and a specific smart contract client program generation device may include more or fewer components than shown in the figures, or combine certain components, or have different component arrangements.

A person skilled in the art may understand that the structure shown in FIG. 4 is merely a block diagram of a part of structure associated with the technical solutions of the present application, and does not constitute a limitation to a generation device of a smart contract client program which the technical solutions of the present application are applied in, and the specific generation device of smart contract client program can include more or less components than that shown in the figures, or combine some components, or have arrangements of components.

In one embodiment, a computer device is provided, the computer device includes a memory and a processor, the memory stores a computer program, when the computer program is executed by the processor, the steps in the method for active failure recovery of single node improved based on PBFT algorithm are implemented.

In one embodiment, a computer readable storage medium is provided, the storage medium stores a computer program, that, when being executed by a processor, causes the processor to realize the steps in the method for active failure recovery of single node improved based on PBFT algorithm.

The person of ordinary skilled in the art may be aware of that, a whole or a part of flow process of implementing the method in the aforesaid embodiments of the present application may be accomplished by using computer program to instruct relevant hardware. The computer program may be stored in a non-volatile computer readable storage medium, when the computer program is executed, the steps in the various method embodiments described above may be included. The non-volatile memory may include ROM (Read Only Memory), programmable ROM, EPROM (Electrically Programmable Read Only Memory), EEPROM (Electrically Erasable Programmable Read Only Memory), or flash memory. The volatile memory may include RAM (Random Access Memory) or external cache memory. By way of illustration instead of limitation, RAM is available in a variety of forms such as SRAM (Static RAM), DRAM (Dynamic RAM), SDRAM (Synchronous DRAM), DDR (Double Data Rate) SDRAM, ESDRAM (Enhanced SDRAM), Synchlink DRAM, RDRAM (Rambus Direct RAM), DRDRAM (Direct RamBus Dynamic RAM), and RDRAM (Rambus Dynamic RAM), etc.

The technical features in the above embodiments can be combined arbitrarily, for the sake of simplicity, not all possible combinations of the technical features in the above embodiments are described, however, as long as the combinations of these technical features do not contradict with each other, these combinations should all be considered as being included in the scope of the specification of the present application.

The person of ordinary skill in the art should understand that, the forgoing only describe some preferable embodiments of the present application and is not intended to limit the present application. Although the present application has been explained in detail with reference to the aforesaid embodiments, for the person of ordinary skilled in the art, the technical solutions disclosed in the embodiments can also be modified, some technical features can also be equivalently replaced; these modifications or equivalent replacements which are made in the spirit and the principle of the present application should all be included in the protection scope of the present application.

What is claimed is:

1. A method for active failure recovery of a single node improved based on PBFT algorithm, which is implemented by a computer device, wherein a point-to-point network containing (3f+1) nodes is required in the PBFT algorithm, Byzantine errors of f nodes are tolerable for this point-to-point network, and the method comprises following steps:

step S1: enabling a node operated normally to enter into an abnormal state to become an abnormal node when detecting a failure in a system due to network malfunction;

step S2: broadcasting a view change request to all nodes in a whole network, and requesting to enter a next view by the abnormal node; wherein the view change request in the step S2 comprises an ID, a proposed view value, a height of a stable checkpoint, and PQC information of the node;

step S3: waiting for view change requests from other nodes within a predetermined period of time and counting a number of the view change requests, and performing recovery for the abnormal node according to a view change recovery method in the PBFT algorithm by the abnormal node, if (2f+1) view change requests containing the same view value are received within the predetermined period of time; or alternatively enabling the abnormal node to enter into a state to be recovered to become a node to be recovered if (2f+1) view change requests are not received within the predetermined period of time;

step S4: broadcasting a recovery request to all nodes in the whole network by the node to be recovered, wherein the recovery request includes an ID of the node to be recovered;

step S5: waiting for replies from other nodes and counting a number of the replies within the predetermined period of time by the node to be recovered, wherein each of other normal nodes returns a view value and a height of a stable checkpoint, an ID and PQC information thereof after receiving the recovery request from the node to be recovered; entering step S6 to perform a state recovery if the node to be recovered receives (2f+1) replies with the same view value within the predetermined period of time; or alternatively returning to step S4 if the node to be recovered fails to receive (2f+1) replies with the same view value within the predetermined period of time;

wherein the PQC information comprises a Pre-Prepare message, a Prepare message, and a Commit message;

step S6: calculating, by the node to be recovered, a height of a stable checkpoint of the whole network according to checkpoint information returned by the (2f+1) nodes, performing recovery on the stable checkpoint through a fast synchronization algorithm in the PBFT algorithm, and performing a final recovery after the recovery performed on the stable checkpoint is completed, if the height of the stable checkpoint of the node to be recovered is lower than the height of the stable checkpoint of the whole network; or directly performing a final recovery in step S7 if the height of the stable checkpoint of the node to be recovered is equal to or greater than the height of the stable checkpoint of the whole network;

step S7: submitting a request for obtaining PQC information after the stable checkpoint to all nodes of the whole network by the node to be recovered;

step S8: returning, by the other normal nodes, all PQC information after the stable checkpoints of the other normal nodes, after receiving the request for obtaining the PQC information; and step S9: redoing the PQC information, by the node to be recovered, according to PQC reply information received from the other normal nodes until the node to be recovered is restored to a height of normal node, thus completing recovery of the abnormal node.

2. The method according to claim 1, wherein the view change request in the step S2 further comprises signature information of the abnormal node.

3. The method according to claim 1, wherein in the step S3 and the step S5, a counting rule is that one node can only be counted one time, the node is counted one time when reply information is received multiple times from the same node at the same time within the predetermined period of time.

4. The method according to claim 1, wherein the replies from the other normal nodes in the step S5 further comprise signature information of the other normal nodes.

5. The method according to claim 1, wherein in the step S9, the node to be recovered redoes the PQC information at a height above the height thereof so as to be avoided from a repeated execution of the same PQC after receiving the PQC reply information, thus being caused to execute an error process to enter an abnormal state again.

6. A method for active failure recovery of a single node improved based on PBFT algorithm, which is implemented by a computer device, wherein the method is applied to a point-to-point network containing (3f+1) nodes, Byzantine errors of f nodes are tolerable for this point-to-point network, the method comprises following steps:

determining an abnormal node, and sending a view change request to other nodes in a whole network by the abnormal node; wherein the view change request is used by the abnormal node to request to enter a next view, the view change request comprises an ID of the node, a view value proposed by the node, a height of a stable checkpoint of the node, and PQC-Set information of the node; and wherein the PQC-Set information respectively corresponds to P-Set Q-Set, and C-Set which are defined for recovery of view change in the PBFT algorithm;

waiting for view change requests from other nodes and counting a number of the view change requests within a first predetermined period of time, and setting the abnormal node as a node to be recovered if (2f+1) view change requests are not received within the first predetermined period of time;

sending a recovery request to other nodes in the whole network by the node to be recovered, wherein the recovery request comprises an ID of the node to be recovered;

waiting for replies from the other nodes and counting a number of the replies in a second predetermined period of time, wherein each other node returns a view value and a height of a stable checkpoint, an ID, and PQC-Set information thereof after receiving the recovery request of the node to be recovered; and performing a state recovery if (2f+1) replies containing the same view value are received within the second predetermined period of time;

said performing the state recovery comprises:

obtaining a height of a stable checkpoint of the whole network according to the height of the stable checkpoint and the PQC-Set information returned by the (2f+1) nodes, performing a recovery on the stable checkpoint through a fast synchronization algorithm in the PBFT algorithm, and performing a final recovery after the recovery performed on the stable checkpoint is completed, if the height of the stable checkpoint of the node to be recovered is lower than the height of the stable checkpoint of the whole network; or alternatively performing the final recovery if the height of the stable checkpoint of the node to be recovered is greater than or equal to the height of the stable checkpoint of the whole network;

said performing the final recovery comprises:
obtaining, by the node to be recovered, PQC information after the stable checkpoints from the other nodes in the whole network, wherein the PQC information comprises a Pre-Prepare message, a Prepare message, and a Commit message; and redoing the PQC information according to PQC reply information after the other nodes return their own stable checkpoints, until the node to be recovered is restored to a normal node.

7. The method according to claim 6, wherein after the step of waiting for view change requests from other nodes and counting the number of the view change requests within the first predetermined period of time, the method further comprises a step of:
performing a recovery for the node to be recovered through a view change recovery method in the PBFT algorithm, if (2f+1) view change requests containing the same view value are received in the first predetermined period of time.

8. The method according to claim 6, wherein after the step of waiting for view change requests from other nodes and counting the number of the view change requests within the second predetermined period of time, the method further comprises a step of:
returning to perform the step of sending the recovery request to all other nodes in the whole network by the node to be recovered, if the node to be recovered fails to receive (2f+1) replies containing the same view value.

9. The method according to claim 6, wherein the view change request further comprises signature information of the node.

10. The method according to claim 6, wherein each node is counted one time in a counting process.

11. The method according to claim 6, wherein the recovery request further comprises signature information of the node to be recovered.

12. The method according to claim 6, wherein the PQC reply information after the other nodes return their own stable checkpoints comprises signature information of the node.

13. The method according to claim 6, wherein said redoing according to the PQC reply information after the other nodes return their own stable checkpoints comprises a following step of:
redoing PQC information at a height above the height of the stable checkpoint of the node to be recovered.

14. A non-transitory computer-readable storage medium which stores a computer program, that, when being executed by a processor of a computer device, causes the processor to implement the method of claim 6.

15. A computer device, comprising: a memory and a processor, wherein the memory stores a computer program, that, when being executed by the processor, causes the processor to implement a method for active failure recovery of a single node improved based on PBFT algorithm, comprising steps of:
step S1: enabling a node operated normally to enter into an abnormal state to become an abnormal node when detecting a failure in a system due to network malfunction;
step S2: broadcasting a view change request to all nodes in a whole network, and requesting to enter a next view by the abnormal node; wherein the view change request in the step S2 comprises an ID, a proposed view value, a height of a stable checkpoint, and PQC information of the node;
step S3: waiting for view change requests from other nodes within a predetermined period of time and counting a number of the view change requests, and performing recovery for the abnormal node according to a view change recovery method in the PBFT algorithm by the abnormal node, if (2f+1) view change requests containing the same view value are received within the predetermined period of time; or
alternatively enabling the abnormal node to enter into a state to be recovered to become a node to be recovered if (2f+1) view change requests are not received within the predetermined period of time;
step S4: broadcasting a recovery request to all nodes in the whole network by the node to be recovered, wherein the recovery request includes an ID of the node to be recovered;
step S5: waiting for replies from other nodes and counting a number of the replies within the predetermined period of time by the node to be recovered, wherein each of other normal nodes returns a view value and a height of a stable checkpoint, an ID and PQC information thereof after receiving the recovery request from the node to be recovered; entering step S6 to perform a state recovery if the node to be recovered receives (2f+1) replies with the same view value within the predetermined period of time;
or alternatively returning to step S4 if the node to be recovered fails to receive (2f+1) replies with the same view value within the predetermined period of time;
wherein the PQC information comprises a Pre-Prepare message, a Prepare message, and a Commit message;
step S6: calculating, by the node to be recovered, a height of a stable checkpoint of the whole network according to checkpoint information returned by the (2f+1) nodes, performing recovery on the stable checkpoint through a fast synchronization algorithm in the PBFT algorithm, and performing a final recovery after the recovery performed on the stable checkpoint is completed, if the height of the stable checkpoint of the node to be recovered is lower than the height of the stable checkpoint of the whole network; or directly performing a final recovery in step S7 if the height of the stable checkpoint of the node to be recovered is equal to or greater than the height of the stable checkpoint of the whole network;
step S7: submitting a request for obtaining PQC information after the stable checkpoint to all nodes of the whole network by the node to be recovered;
step S8: returning, by the other normal nodes, all PQC information after the stable checkpoints of the other normal nodes, after receiving the request for obtaining the PQC information; and
step S9: redoing the PQC information, by the node to be recovered, according to PQC reply information received from the other normal nodes until the node to be recovered is restored to a height of normal node, thus completing recovery of the abnormal node.

16. The computer device according to claim 15, wherein the view change request in the step S2 further comprises signature information of the abnormal node.

17. The computer device according to claim 15, wherein in the step S3 and the step S5, a counting rule is that one node can only be counted one time, the node is counted one time when reply information is received multiple times from the same node at the same time within the predetermined period of time.

18. The computer device according to claim 15, wherein the recovery request in the step S4 further comprises signature information of the node to be recovered.

19. The computer device according to claim 15, wherein the replies from the other normal nodes in the step S5 further comprise signature information of the other normal nodes.

20. The computer device according to claim 15, wherein in the step S9, the node to be recovered redoes the PQC information at a height above the height thereof so as to be avoided from a repeated execution of the same PQC after receiving the PQC reply information, thus being caused to execute an error process to enter an abnormal state again.

* * * * *